United States Patent

[11] 3,548,090

[72] Inventor Jack L. Sciurba
Norridge, Ill.
[21] Appl. No. 671,717
[22] Filed Sept. 29, 1967
[45] Patented Dec. 15, 1970
[73] Assignee Motorola, Inc.
Franklin Park, Ill.
a corporation of Illinois

[54] SIGNAL TRANSLATING SYSTEM WHICH REJECTS A PARTICULAR FREQUENCY

10 Claims, 2 Drawing Figs.

[52] U.S. Cl. 178/5.8
[51] Int. Cl. H04n 5/14
[50] Field of Search 178/5.8, 5.4; 333/6, 76

[56] References Cited

UNITED STATES PATENTS

| | | | |
|---|---|---|---|
| 2,884,485 | 4/1959 | Shlachter | 178/5.4X |
| 3,103,554 | 9/1963 | Avins et al. | 178/5.8 |
| 3,217,096 | 11/1965 | Caprio et al. | 178/5.8 |
| 3,358,246 | 12/1967 | Bensasson | 178/5.8X |

*Primary Examiner*—Richard Murray
*Attorney*—Mueller, Aichele & Rauner

ABSTRACT: The system includes input and output inductively coupled windings tuned to frequencies within the desired passband. An additional winding is coupled in phase opposition between the output winding and a reference potential. A circuit inductively coupled to the input winding and to the additional winding couples the proper phase and amplitude of an undesired signal at a particular frequency within the passband to the additional winding to cancel the corresponding undesired signal in the output winding.

PATENTED DEC 15 1970

3,548,090

Inventor
JACK L. SCIURBA

BY Mueller, Aichele & Rauner

ATTYS.

SIGNAL TRANSLATING SYSTEM WHICH REJECTS A PARTICULAR FREQUENCY

BACKGROUND OF THE INVENTION

The standard color television signal basically comprises brightness information components modulated on a main carrier, color information components modulated on a 3.58 MHz color subcarrier, and a modulated sound carrier. When such a composite signal is received by a color television receiver, the frequency of the individual components are reduced in a tuner to provide intermediate frequency signals with the frequency of the main carrier being 45.75 MHz, the frequency of the color subcarrier being 42.17 MHz and the frequency of the sound carrier being 41.25 MHz. Unless the modulated sound carrier is substantially attenuated, it will appear as noise in the reproduced image. Because the video detector is a nonlinear device, it mixes the sound carrier and the color subcarrier to produce a low frequency component of 920 KHz not easily attenuated in the succeeding video amplifiers. Accordingly, it is most desirable that the sound carrier be rejected or substantially attenuated before reaching the video detector.

The spacing between the sound carrier and the edge of the lower sideband of the modulated color subcarrier (about 41.67 MHz) is only 400 KHz so that if the circuit to reject the sound carrier does not have a steep enough attenuation characteristic, some of the color information may become lost.

Some rejection circuits operate on a cancellation principle wherein the IF band-pass circuit translates both the video components consisting of the color and brightness information and the sound carrier. A resonant circuit selects only the sound carrier and combines it with the signal translated by the band-pass circuit in such a manner as to cancel the sound carrier appearing in such signal. Present day cancellation circuits have not been entirely satisfactory as they have had insufficient control to provide optimum cancellation. Without means to control both the phase and the amplitude of the canceling signal, substantial attenuation of the sound carrier is not realizable.

SUMMARY OF THE INVENTION

It is, therefore, an object of this invention to provide an improved signal-translating system wherein a desired range of frequencies is passed relatively unattenuated whereas substantial attenuation is provided to an undesired frequency.

Another object is to provide, in the intermediate frequency amplifier system of a television receiver, a signal-translating circuit for substantially reducing the amplitude of the modulated sound carrier which is applied to the video detector in order to minimize interference with the reproduced picture.

Another object is to provide a signal-translating circuit with a signal rejection portion that works on a cancellation principle and which includes means to control both the phase and amplitude of a canceling signal.

A further object is to provide a relatively inexpensive and easy to tune band-pass circuit for a color television receiver.

In practicing the invention, signals are applied to a circuit including a first inductor for passing signals within a selected frequency range. Another circuit including a second inductor inductively coupled to the first inductor passes the signals within the range to an output circuit. A resonant circuit having a third inductor is coupled in series phase opposition with the second inductor and to a reference potential for receiving signals at a predetermined frequency within the selected frequency range. A circuit is inductively coupled to the first inductor and to the third inductor and has component values along with the component values of the resonant circuit to provide signals in the resonant circuit at the predetermined frequency and of a phase and amplitude to combine with and substantially cancel the signals appearing across the second inductor at the predetermined frequency.

More specifically, such signal-translating system may be used in a color television receiver wherein the intermediate frequency signals which comprise video components occupying the selected frequency range and a modulated sound carrier component occupying the predetermined frequency are applied to the first inductor which along with the second inductor are tuned to pass the intermediate frequency signals. The resonant circuit is sharply tuned to a frequency near the frequency of the sound carrier component to receive the same and cancel the corresponding component appearing across the second inductor. The components of both the resonant circuit and the coupling circuit are preferably adjustable in order to provide the correct phase and amplitude of the canceling signal to maximize cancellation of the sound carrier component.

DETAILED DESCRIPTION OF THE PREFERRED EMBODIMENT

Figures 1, 2:
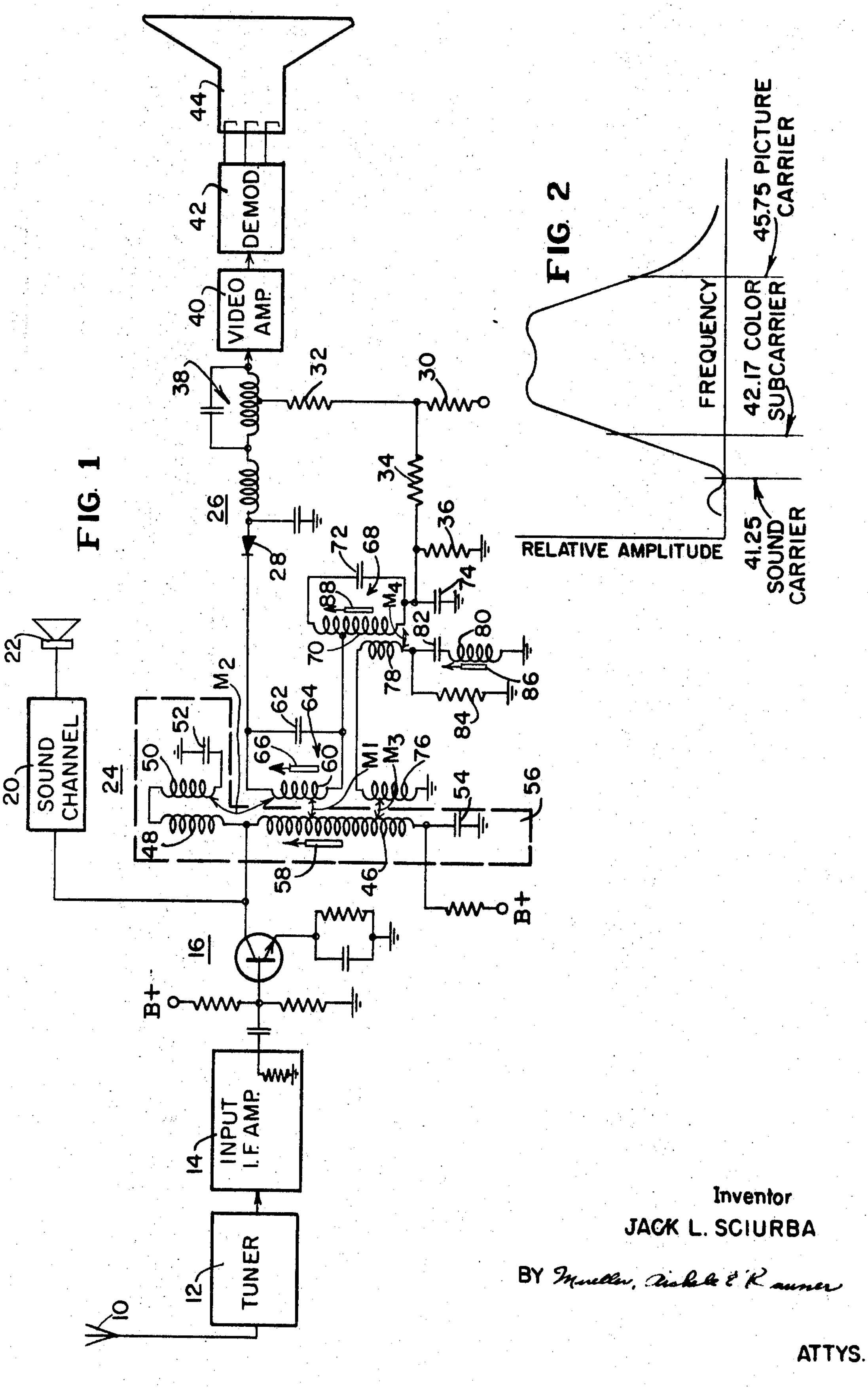
FIG. 1 illustrates a color television receiver partially in block and partially in schematic incorporating the features of the invention.
FIG. 2 illustrates the band-pass response of the intermediate frequency amplifier system of FIG 1.

Referring now to the color television receiver of FIG. 1, incoming signals appearing at antenna 10 are reduced in frequency by tuner 12 to provide intermediate frequency (IF) signals consisting of three basic components, a picture carrier at 45.75 MHz modulated by the brightness components, a color subcarrier at 42.17 MHz modulated by the color information signals, and a sound modulated carrier at 41.25 MHz. The composite IF signal is amplified in IF amplifiers 14 and 16. A portion of the modulated picture carrier and the modulated sound carrier are applied to a sound channel 20 which develops an intercarrier sound signal at 4.5 MHz and detects the same to develop audio signals for the speaker 22.

The composite IF signal is coupled through the signal-translating system 24, to be explained hereinafter, and applied to the video detector circuit 26. A B+ bias voltage is applied through resistors 30 and 32 to the anode of the detector diode 28, and the voltage dividing network consisting of resistors 30, 34 and 36 applies a bias voltage to the cathode of the diode. The diode, due to its nonlinearity, acts like a mixer to develop an undesired 4.5 MHz intercarrier sound signal which is attenuated by the trap circuit 38. The brightness components and color information components are amplified in video amplifier 40 and demodulated in demodulator 42 to provide video voltages for the trigun cathode ray tube 44 to reproduce an image in color.

If the modulated 41.25 MHz sound carrier is not filtered out before it reaches the video detector circuit 26, it will be reflected as noise and other spurious information in the reproduced image. In addition, the sound carrier is necessarily close to the 42.17 color subcarrier and if the sound carrier is not substantially attenuated before it reaches the video detector circuit 26, the nonlinearities of the diode 28 will cause mixing of the sound carrier and color subcarrier to produce a 920 KHz beat signal which due to its low frequency, is difficult to attenuate in the video amplifier 40. The signal-translating system 24 accomplishes such attenuation prior to the detector circuit 26.

Ideally, signals from 41.67 MHz (the edge of the lower color sideband which is about 400 KHz below the 42.17 MHz color subcarrier) to the 45.75 picture carrier should be translated through system 24 unattenuated. However, in order to provide sufficient attenuation of the 41.25 MHz sound carrier, it is necessary to attenuate the color subcarrier to some degree also. In a practical embodiment of the color television receiver of FIG. 1, the IF section consisting of IF amplifier 14 and 16 and translating system 24 yielded the IF band-pass response shown in FIG. 2. Between 43 and 45 MHz the characteristic was relatively flat, at 42.17 MHz the response was down about 45 percent, at 45.75 MHz the response was down about 60 percent, and at 41.25 MHz the response was down about 99.4 percent.

Considering signal-translating system 24 in detail, a first inductance winding consists of series connected segments 46, 48 and 50. A first capacitance consists of a pair of series connected capacitors 52 and 54 coupled in shunt with a first inductance winding to form a parallel resonant circuit 56. The inductance in a resonant circuit 56 is made variable by providing segment 46 with an axially adjustable core 58. The position of core 58 is selected to tune the resonant circuit 56 at a frequency within the passband such as 43 MHz which is at the lower end of the relatively flat portion of the response of FIG. 2. A second inductance winding 60 is inductively coupled to segment 46 of the first winding as indicated by $M_1$, and is coupled in shunt with capacitor 62 to form a parallel resonant circuit 64. The inductance in resonant circuit 64 is made variable by providing winding 60 with an axially adjustable core 66. The position of core 66 is selected to tune the resonant circuit 64 at, for example, 45 MHz, the upper end of the flat portion of the response of FIG. 2. In order to provide closer coupling between the resonant circuits 56 and 64, segment 50 of the first inductance winding is wound around second inductance winding 60 to provide an additional mutual coupling $M_2$. The staggered tuning of resonant circuits 56 and 64 provide the flat topped response of FIG. 2. It should be appreciated, however, that there are similar resonant circuits in input IF amplifier 14 and it is actually these in combination with circuits 56 and 64 which produce the flat topped response. Without further circuitry, the 41.25 MHz sound carrier will appear across winding 60 only slightly attenuated (due to the characteristics of the resonant circuits) and thus it will be translated to the detector 26.

The system 24 also includes a parallel resonant circuit 68 having a third inductance winding 70 with a tap coupled to the bottom of resonant circuit 64 and a capacitor 72 coupled across the winding 70. The resonant circuit 68 has a high Q and is sharply tuned to a frequency near the 41.25 MHz sound carrier, the proximity depending on certain factors to be presently considered. The bottom of the resonant circuit 68 is coupled to a reference potential, here AC ground, through a bypass capacitor 74.

The signal-translating circuit 24 further includes a fourth inductance winding 76 inductively coupled to winding 46 as indicated by $M_3$. A fifth inductance winding 78 is inductively coupled to winding 70 as indicated by $M_4$. A series resonant circuit comprising an inductance 80 and a capacitor 82 are coupled in series with the windings 76 and 78. A resistor 84 is coupled in shunt with the series resonant circuit to damp the same. IF signals appearing across the segment 46 of the first inductance winding are coupled through the winding 76, to winding 78 to appear across the winding 70. Since the resonant circuit 68 is sharply tuned to a frequency near the 41.25 MHz sound carrier, only the sound carrier has an appreciable amplitude across the winding 70. Winding 60 in resonant circuit 64 and winding 70 in resonant circuit 68 are oppositely poled so that the sound carrier appearing across winding 70 combines with the sound carrier appearing across winding 60 to substantially cancel the same. The inductance of winding 80 is made variable by providing it with an axially adjustable core 86 to control primarily the phase of the signal being coupled to the winding 70 and to control its amplitude to some degree. The inductance of winding 70 is also made variable by the core 88 to control the amplitude of the sound carrier and to partially control its phase.

It should be appreciated that the sound carrier across winding 60 will be canceled only if the sound carrier across the winding 70 is exactly equal in amplitude and opposite in phase. By providing two adjustments, one primarily for phase and one primarily for amplitude, cores 86 and 88 respectively, such optimum condition may be more nearly approached. In a practical embodiment 45 db of attenuation of the sound carrier relative to the color subcarrier was attained as compared to the 30 db generally realized in present day circuits. Because resonant circuit 68 has a high Q it has only a slight effect on the video signals adjacent the sound carrier.

In aligning a color television receiver incorporating the signal translating signal 24, a sweep generator supplying signals within a range of 40 to 48 MHz, for example, would be coupled to the segment 46 of the first inductance winding. A scope is connected to either the input of the detector circuit 26 or to a point in the video amplifiers 40 to monitor the response of the signal-translating circuit 24. Core 58 in segment 46 of the first inductance winding and core 66 in the second inductance winding 60 are adjusted to maximize the response to signals within a band of frequencies from approximately 43 to 45 MHz. The cores 86 and 88 in windings 80 and 70 respectively, are alternately adjusted to provide maximum attenuation of the sound carrier. When the alignment is completed, the response will have the appearance shown in FIG. 2.

What has been described, therefore, is an improved signal translating circuit especially adapted for use in a color television receiver which passes a selected range of frequencies and provides substantial attenuation for a signal at a given frequency within such range.

I claim:

1. A signal-translating system including in combination; an input circuit for providing signals, an output circuit for utilizing the signals, first circuit means including first inductance means coupled to said input circuit for passing signals within a selected frequency range, second circuit means including second inductance means inductively coupled to said first inductance means for passing signals within said range to said output circuit, a resonant circuit having third inductance means coupled in series phase opposition with said second inductive means and to a reference potential for receiving signals at a predetermined frequency within the selected frequency range, third circuit means inductively coupled to said first inductance means and to said third inductance means and having component values related to the component values of said resonant circuit to provide signals in said resonant circuit at the predetermined frequency and of a phase and amplitude to combine with and substantially cancel the signals appearing across said second inductance means at said predetermined frequency.

2. The signal-translating system set forth in claim 1 wherein said third circuit means comprises series coupled fourth and fifth inductance means and impedance means, and wherein said fourth inductance means is inductively coupled to said first inductance means, and wherein said fifth inductance means is inductively coupled to said third inductance means.

3. The signal-translating system set forth in claim 2 wherein said impedance means is adjustable and wherein the value of at least one of the components in said resonant circuit is also adjustable to permit selection of the phase and amplitude of the signals at the predetermined frequency appearing across said third inductance means.

4. The signal-translating system set forth in claim 1 wherein said first circuit means includes capacitance means broadly tuned with said first inductance means to a frequency within the selected frequency range, wherein said second circuit means includes capacitance means broadly tuned with said second inductance means to a frequency within the selected frequency range, and wherein said resonant circuit includes capacitance means sharply tuned with said third inductance means to a frequency near said predetermined frequency.

5. In a television receiver having means to supply intermediate frequency signals in response to signals received by the receiver, which intermediate frequency signals comprise video components occupying a given frequency range and a modulated sound carrier component at an intermediate frequency adjacent the given frequency range, a video detector for demodulating the video components, an intermediate frequency amplifier circuit to pass the video components to the detector and to substantially prevent the sound carrier component from being applied to the detector, which amplifier circuit includes in combination; a first resonant circuit for receiving the intermediate frequency signals and including capacitance means and a first inductance winding broadly tuned to an intermediate frequency for passing the video components and the sound carrier component, a second resonant circuit including further capacitance means and a second inductance winding inductively coupled to said first winding and broadly tuned to an intermediate frequency for causing the video components and the sound carrier components to appear across said second winding, a third resonant circuit having a third inductance winding coupled in series phase opposition between said second winding and a reference potential, said third resonant circuit further including capacitance means sharply tuned with said third winding to a frequency near the frequency of the sound carrier component, circuit means inductively coupled to said first winding and to said third winding and having component values along with the component values of said third resonant circuit to impress the sound carrier components across said third inductance winding with a phase and an amplitude to combine with and substantially cancel the sound carrier component appearing across said second inductance winding.

6. The television receiver set forth in claim 5 wherein said circuit means comprises series coupled fourth and fifth inductance windings and impedance means, wherein said fourth inductance winding is inductively coupled to said first inductance winding, and wherein said fifth inductance winding is inductively coupled to said third inductance winding.

7. The television receiver set forth in claim 6 wherein said impedance means is a series resonant circuit comprised of capacitance means and inductance means coupled in series between said fourth and fifth inductance windings, and wherein the inductance of said inductance means and of said third inductance winding are variable to permit selection of the phase and amplitude of the sound carrier component appearing across said third inductance winding.

8. The television receiver set forth in claim 7 wherein said impedance means further comprises damping resistance means coupled in shunt with said capacitance means and said inductance means.

9. The television receiver set forth in claim 5 wherein said third inductance winding has a tap coupled to said second inductance winding.

10. The television receiver set forth in claim 5 wherein said intermediate frequency amplifier circuit comprises a series of cascaded amplifiers, the last of which is coupled to said first resonant circuit, and wherein said second resonant circuit is coupled to the video detector.